United States Patent [19]

Takanashi et al.

[11] Patent Number: 5,065,250

[45] Date of Patent: Nov. 12, 1991

[54] IMAGE PICK-UP APPARATUS

[75] Inventors: Itsuo Takanashi, Kamakura; Shintaro Nakagaki, Fujisawa; Tsutou Asakura, Yokohama; Masato Furuya; Tetsuji Suzuki, both of Yokosuka; Toshikatsu Ichitou, Kawasaki; Takashi Yamamura, Yokohama; Hiromichi Tai, Yokosuka, all of Japan

[73] Assignee: Victor Company of Japan, Ltd., Yokohama, Japan

[21] Appl. No.: 541,903

[22] Filed: Jun. 22, 1990

Related U.S. Application Data

[63] Continuation-in-part of Ser. No. 396,203, Aug. 21, 1989, Pat. No. 4,945,423, which is a continuation-in-part of Ser. No. 301,324, Jan. 24, 1989, Pat. No. 4,956,714, which is a continuation-in-part of Ser. No. 139,005, Dec. 29, 1987, Pat. No. 4,831,452.

[30] Foreign Application Priority Data

Jun. 26, 1989 [JP] Japan ................................ 1-163178

[51] Int. Cl.[5] ........................ H04N 1/29; H04N 5/80; H04N 1/028; H04N 5/30

[52] U.S. Cl. .................................. 358/300; 358/471; 358/335; 358/209; 358/909

[58] Field of Search ............... 358/335, 300, 909, 209, 358/471, 474, 213.11; 355/210, 245, 202, 296; 346/153.1, 155, 160; 365/112; 430/56

[56] References Cited

U.S. PATENT DOCUMENTS

| | | | |
|---|---|---|---|
| 3,869,697 | 3/1975 | Kawasaki . | |
| 4,908,711 | 3/1990 | Majima | 358/300 |
| 4,956,714 | 9/1990 | Takanashi | 358/213.11 |

FOREIGN PATENT DOCUMENTS

| | | |
|---|---|---|
| 63-168631 | 7/1988 | Japan . |

*Primary Examiner*—Benjamin R. Fuller
*Assistant Examiner*—Scott A. Rogers
*Attorney, Agent, or Firm*—Fleit, Jacobson, Cohn, Price, Holman & Stern

[57] ABSTRACT

A charge recording and reproducing device is constituted by a transfer device which transfers a film shaped recording medium from one to other side, a recording head adapted to form an electrostatic latent image from an image formed on the recording medium, an eraser for erasing the electrostatic latent image, a developing apparatus for developing the electrostatic latent image, and a reading device for reading the developed image.

3 Claims, 3 Drawing Sheets

IMAGE PICK-UP APPARATUS

This application is a continuation in part of a copending application Ser. No. 396,203 filed on Aug. 21, 1989, U.S. Pat. No. 4,945,423, which is a continuation in part of U.S. Pat. No. 4,956,714, which is a continuation in part of U.S. Pat. No. 4,831,452.

BACKGROUND OF THE INVENTION

This invention relates to a system of recording and reproducing an electric charge image.

Since image signals obtained by electronic image-taking an object have such advantageous features that the image signals are easily handled to edit, trimming and other picture image processings and also to reproduce and erase the records, the image signals are widely used in such fields as printing, electronic printing and measuring. Consequently, it has been strongly desired to develop a device which enables photographing and recording a moving picture which requires to obtain optical image informations corresponding to a plurality of times, as well as a device capable of photographing and recording a single picture image at a higher resolution than a prior art device.

In a conventional image pick-up device utilizing an image pick-up tube as an image pick-up element, since there is a limit for down-sizing the electron beam diameter of the image pick-up tube it is impossible to realize a high degree of resolution by reducing an electron beam diameter. Moreover, since the target capacity of the image pick-up tube increases as the target area increases, it has been impossible to obtain a high degree of resolution by increasing the target area. Further, in a case of an image pick-up device of a moving picture, for example, since the frequency band of the image signals ranges from several tens MHz to higher than several hundreds MHz, the S/N ratio presents a problem. For the reasons described above, it has been difficult to produce such image signal reproduced from a picture image of a high picture quality and a high resolution. Accordingly, it has been strongly desired to obtain an image pick-up device capable of efficiently producing an image signal reproduced from a picture image of a high picture quality and a high resolution.

With increasing requirement for recording various information signals at a high recording density, in recent years, high density recording and reproducing devices have been developed capable of high density recording and reproducing an information signal by using a recording medium operating with various constructions and functions. For example, various devices have been proposed including pit forming type, foam or irregular shape type, magneto-optical type, phase transfer type, heat transition type (wherein light transmissibility, percentage of reflection, percentage of absorption, etc. are caused to vary by heat energy). Furthermore, a device utilizing a recording medium wherein recording and reproducing operations are effected by an energy other than a light energy and a recording and reproducing device utilizing such medium have also been proposed.

We have also proposed various devices in which an optical image information corresponding to an optical image of an object to be photographed is focused on a reversible charge image recording medium through an image pick-up lens so as to record and reproduce an information to be recorded and reproduced in and from a charge image recording medium or a device capable of recording and reproducing an information to be recorded on a charge image recording medium as a charge image having a high resolution.

These devices could record an electromagnetic radiation information to be recorded on the charge image recording medium as a charge image having a ultra high resolution. However, the reading out of the charge image having the ultra high resolution and recorded on the charge image recording medium has been effected by using an electrostatic voltage detecting means which takes (or reads) out a voltage created by electrostatic induction in a detection electrode in an electric field formed by a charge image or by disposing an optical read out head containing photo-modulation member and positioned in an electric field created by the charge image, thereby optically detecting the charge image stored on the charge image recording medium, so that where the electrostatic voltage detecting means or the optical read out head is used it is not always possible to produce such information signal that ensures a reproduced image of a high resolution.

SUMMARY OF THE INVENTION

Accordingly, it is an object of this invention to provide a novel recording and reproducing system capable of obtaining a reproduced image of a high resolution even when the electrostatic voltage detecting means or an optical read out head is used.

According to this invention there is provided a charge image recording and reproducing system comprising, transfer means for transferring a recording medium from one side to the other side, a recording head forming an electrostatic latent image from an image focused on the recording medium, erasing means positioned on an upstream side of the recording head for erasing the electrostatic latent image, developing means positioned on a downstream side of the recording head for developing the electrostatic latent image, and developed image reading means located on a downstream side of the developing means for reading the developed image.

With the system described above, since a highly accurate electrostatic image is formed and the image is then developed, it is possible to obtain a reproduced image of a high resolution.

DESCRIPTION OF THE PREFERRED EMBODIMENT

Figure 1:
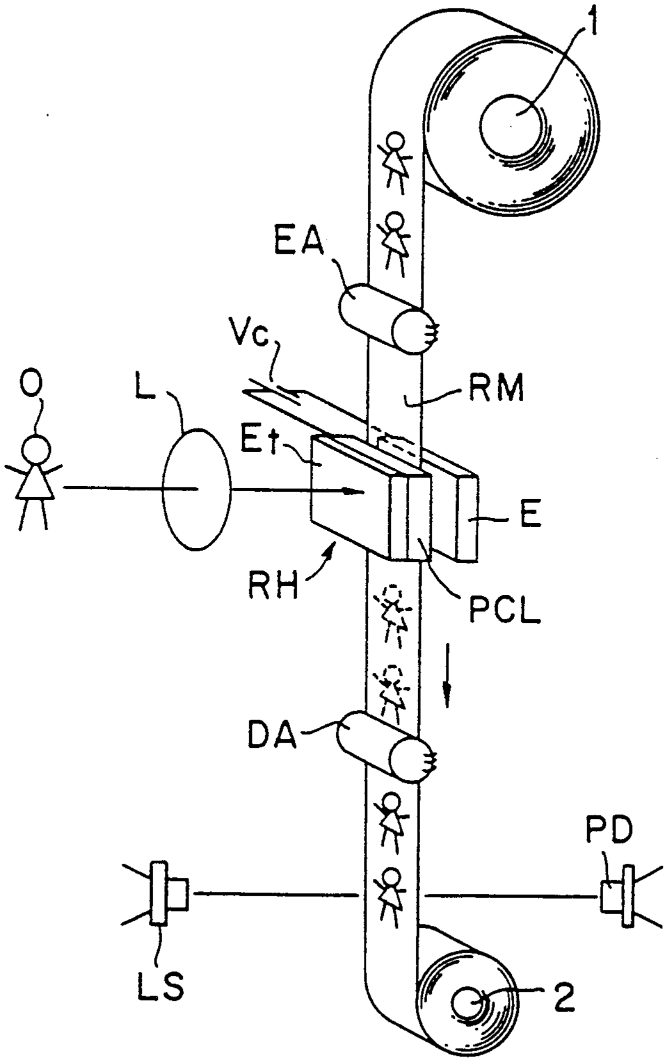
FIG. 1 is a perspective view showing one embodiment of the recording and reproducing system of a charge image according to this invention.

FIG. 1 is a block diagram showing one example of the construction of a recording and reproducing system embodying this invention. In FIG. 1, O designates an object to be photographed, L an image pick-up lens, RH a writing head which is constructed by laminating transparent electrodes E and Et, and a photoconductive layer PCL. The transparent electrodes E and Et are connected to opposite terminals of a source of direct current Vc.

RM designates an erasable and reversible charge image recording medium disposed to confront the surface of the photoconductive layer PCL with a small gap therebetween.

Although the charge image recording medium RM shown in FIG. 1 takes the form of a film with both ends wrapped about reels 1 and 2 respectively, the charge image recording medium RM can take other forms, for example a disc, sheet, card or an endless tape.

In addition to the construction described above, the erasable charge image recording medium RM may have different constructions, namely a construction wherein transparent electrodes and a dielectric layer having a high insulating resistance, a silicone resin layer, for example, are laminated, a construction wherein transparent electrodes, a photoconductive layer, a charge transfer suppressive layer, and a dielectric layer are laminated, and a construction wherein a dielectric layer, a layer made up of fine particles of a photoconductor, a charge transfer suppressive layer and a photoconductive layer are laminated.

The recording of the charge image can be made by a photo-migration method (PM method) or a photoelectrophoretic imaging method (PEP method). With these methods it is not necessary to visualize or develop the image by a developing apparatus (DA) to be described hereinafter.

Any one of well known developing apparatus DA can be used that can develop the charge image recorded on the recording medium RM by using a dry type toner or a liquid (wet) type toner. Use of the liquid type toner results in a reproduced picture image of a high resolution.

In addition to a dry type toner and a wet type toner, an electrostatically charged ink can be used, which is normally used in an ink jet printer. As the component of the toner may be used any one of a pigment, a dye and a sublimating dye, but where a dye containing toner is used a satisfactory concentration tone can be obtained.

In FIG. 1, a reference numeral EA shows an erasing device for erasing an information recorded on the reversible charge image recording medium RM prior to the recording a charge image corresponding to an electromagnetic radiation information or the recording medium. The type of the erasing device is determined in accordance with the type of the recording medium.

Where the development of the charge image recorded on the recording medium RM is performed with a liquid toner, the erasing operation can be effected by coating or impregnating a nonpolar solution on the developing surface and then scraping the toner with a blade. It is advantageous to apply a nonpolar solvent on the developing surface although a nonpolar solvent incorporated with such additives as a charge adjusting agent, a binder or the like can be used.

Although in the embodiment shown in FIG. 1 the erasing device E is positioned to the rear (right) side of the reversible charge image recording medium RM, erasing can also be performed by the erasing device dismounted from the recording and reproducing device.

In the recording and reproducing system shown in FIG. 1, while an electric field is being formed between transparent electrode Et and the other electrode E by a DC source Vc of the writing head RH, an electromagnetic radiation image (optical image) of the object O to be recorded is focused on the photoconductive layer PCL through an objective lens L. Then the resistivity of the photoconductive layer PCL varies corresponding to the optical image so that an electric field density distribution corresponding to the optical image would be created between the writing head RH and the charge image recording medium RM.

Then an electric discharge corresponding to the electric field density distribution occurs between the writing head RH and the charge image recording medium RM so as to form a charge image corresponding to the optical image on the charge image recording medium RM.

The charge image recorded on the recording medium RM is developed by a dry toner or a wet toner in the developing apparatus DA. Where the developing is made with a wet toner containing fine particles of a size of about 0.1 micron, for example, the charge image is developed as an image visible to the reproducing light, having a high resolution and fine gradation. The liquid toner utilized to develop a charge image is stable when it is dried and since it can readily be removed by isopropane, the recording medium RM can be used repeatedly.

When the recording medium RM is made up of a photosensitive material it is not necessary to use the writing head RH at the time of forming a charge image on the recording medium so that spreading of electric field caused by a discharge gap formed between the writing head and the recording medium when the writing head is used does not occur. As a consequence, it is not only easy to form a charge image of a high resolution on the recording medium RM but also easy to reproduce an image of high quality by the reproducing light and a toner, thereby readily obtaining picture image informations of high resolutions.

Since the recording of an information on the recording medium is made in such manner as to form an image visible to the reproducing light instead of preserving the recording medium RM over a long time, it is possible to use a recording medium RM having a low preserving capability of a charge image. As a consequence, it is possible to use a recording medium RM made up of a photosensitive material capable of readily forming a picture image information having a high resolution as above described.

A recorded information developed on the recording medium RM at the developing apparatus DA, is reproduced in such manner as to utilize the reproduced information as it is by the reproducing light from light source LS, or to utilize the reproduced information after converting it to an electric signal with a photoelectric converter.

As the reproducing light source LS may be used a laser light source or any one of suitable light sources. The reproducing light radiated from reproducing light source LS may take a form of a light flux having a large cross-sectional area so as to reproduce a recorded information at a time as a light image. On the other hand, the reproducing light may take a light flux having a small cross-sectional area so as to reproduce the recorded informations as time sequential electric signals or light signals by scanning the informations recorded on the recording medium RM. In accordance with the manner of scanning, a suitable light sensor can be used for photoelectric conversion.

It is advantageous to utilize a light signal reproduced from the recording medium after the light signal has been processed by such electromagnetic wave information signal processing apparatus as described in the specification of Japanese patent application No. 89423/1989 filed by the same applicant.

Reproduction of the informations recorded on the recording medium RM by using reproducing light radiated from light source LS can be effected by using the light transmitting through the recording medium RM or light reflected from the recording medium.

Where it is intended to reproduce the recorded information by using the transmitting light, it is necessary to use transparent material for preparing the recording medium RM. In this case, images are developed on the transparent recording medium.

FIG. 1 shows an example of reproducing the recorded information with transmitting light. In this case, the light projected by a read out light source LS transmits through the recording medium on which a image has been developed with a toner, to reach photoelectric transducer PD for detecting the image.

Figure 3:
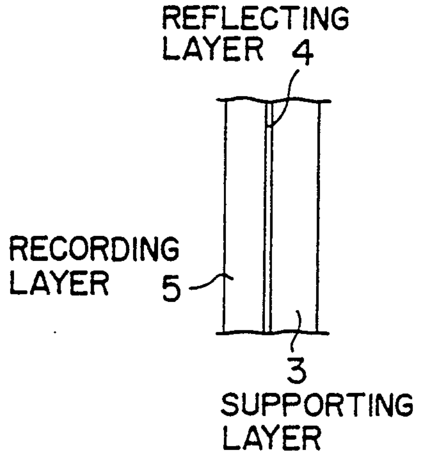
FIG. 3 is a partial view showing a recording medium suitable for reproducing a recorded charge image.

On the other hand, where it is intended to reproduce a recorded information with reflected light, as shown in FIG. 3, the charge recording medium RM is prepared by laminating a recording layer 3 preserving a developed image, and a supporting layer 5 acting as a substrate of the recording medium and a reflecting layer 4 interposed between the recording layer and the supporting layer and made of an aluminum film, for example, to act as an electrode and having a performance of reflecting read out light.

Figure 4:
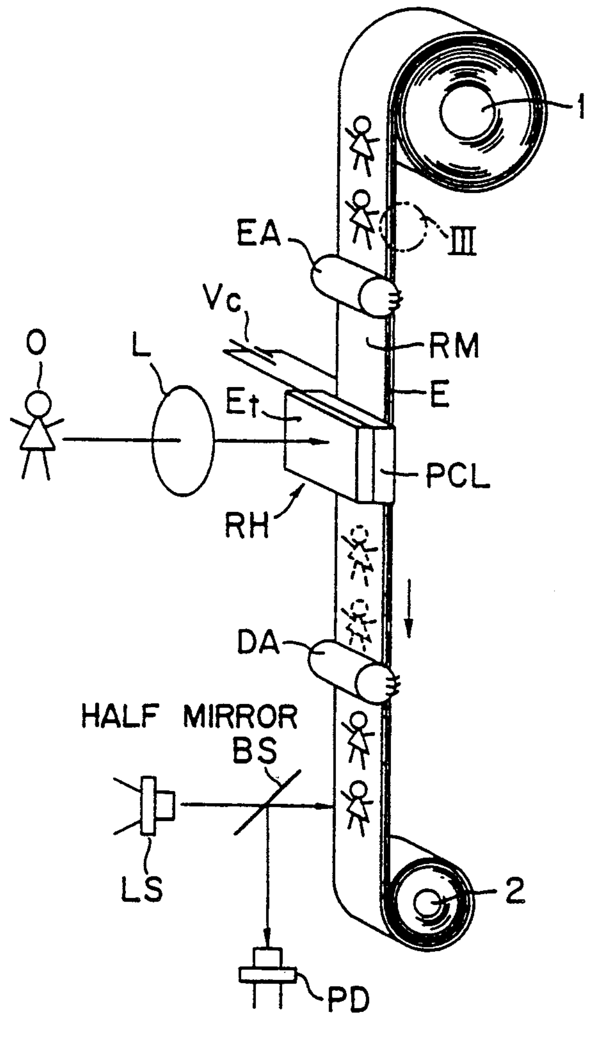
FIG. 4 is a perspective view showing an embodiment of the system of this invention adapted to record and reproduce a charge image by utilizing the recording medium shown in FIG. 3.

FIG. 4 shows a modification of this invention in which reproduction is effected using reflected light. In this case, the read out light radiated from light source LS and transmitted through a developed image is reflected by the reflecting layer 5 shown in FIG. 3. A portion of the light emitted by light source LS is transmitted to photoelectric transducer PD through a half-mirror BS. In this embodiment, the reflecting layer 4 made of aluminum foil and shown in FIG. 3 is used as electrode E, DC voltage Vc being impressed between this electrode E and transparent electrode Et.

When color picture image informations are recorded on and reproduced from the recording medium RM, the recording medium is constructed that informations for respective primary colors of a color picture image to be recorded are recorded in different recording regions of recording medium RM as charge images.

The recording regions just mentioned can be juxtaposed in the direction of transfer of recording medium RM or in a direction perpendicular to the direction of transfer of the recording medium RM. It is advantageous to record marker signals identifying recording regions for recording respective primary color images.

The color picture image informations to be recorded on and reproduced from the recording medium RM may correspond to respective primary color images decomposed by color decomposing stripe filter. Further the marker signals can be recorded for representing conditions of recording or reproducing the charge images.

In the recording and reproducing system shown in FIG. 1, a writing head RH is used for recording informations on the charge image recording medium RM. Alternatively, the recording of informations can also be made by electrophotographic technique.

Where the charge images recorded on recording medium RM and developed as visible images having a high resolution by using a liquid toner, there arises a problem that particle noise appears throughout the entire recording regions.

Figure 2:
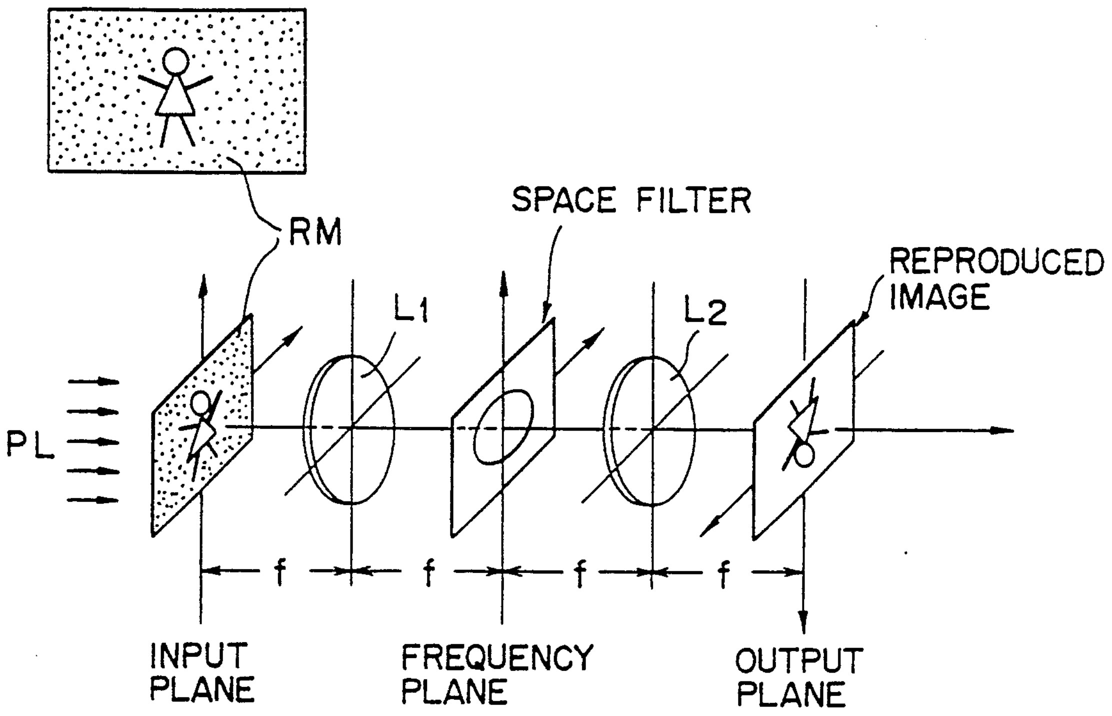
FIG. 2 is an exploded view showing apparatus for removing particle noises.

FIG. 2 shows a developed view showing a light signal processing system utilizing a Fourier transforming optical system capable of eliminating such particular noise. In FIG. 2, when reproducing light RL is impinged upon the recording medium RM carrying a developed image formed with a liquid toner and manifesting high resolution and good gradation, the reproducing light RL would be strongly modulated by the visualized image on the recording medium RM and then transmits through the recording medium RM to impinge upon lens L1.

The charge image recording image RM is positioned in an input plane displaced from lens L1 by its front focal distance $f$. A space filter SF for eliminating the particular noise caused by fine particles of the liquid toner is placed in a frequency Fourier plane displaced from lens L1 by the rear focal distance $f$ of lens L1.

Since the space filter SF is apart from lens L2 by a distance equal to its front focal distance $f$, a reproduced image free from particulate noise caused by the fine particles of the liquid toner can be formed on an output plane apart from lens L2 by a distance equal to the rear focal distance of lens L2.

What is claimed is:

1. An image pick-up apparatus comprising:

transfer means for transferring a recording medium in a downstream direction from one side of the pick-up apparatus to the other side of the apparatus;

a recording head for forming an electrostatic latent image on said recording medium from a two dimensional projected image focused on the head, said recording head comprising a lamination of a transparent electrode and a layer of photoconductive material;

projecting means for forming a two dimensional projected image from optical information of an object on said recording head;

erasing means positioned on an upstream side of said recording head for erasing said electrostatic latent image;

developing means positioned on a downstream side of said recording head for developing said electrostatic latent image, said developing means including toner applying means; and developed image reading means located on a downstream side of said developing means for reading said developed image, said reading means having noise eliminating means for removing particle noise generated by toner particles.

2. The apparatus according to claim 1, wherein said recording medium comprises an electrode acting as a light reflection layer, said lamination being positioned on a side of said recording medium facing said projecting means system, and wherein said reading means comprises a source of light;

a light beam splitter which splits a portion of light emitted from said source of light, such portion being reflected by said light reflecting layer an then transmitted through said developed image; and a detector for detecting said transmitted light.

3. The apparatus according to claim 1, wherein said noise eliminating means comprises a space filter having a Fourier transforming function.

* * * * *